March 25, 1941.   L. E. COOLIDGE ET AL   2,235,868
TROLLING PLANE
Filed Sept. 5, 1940
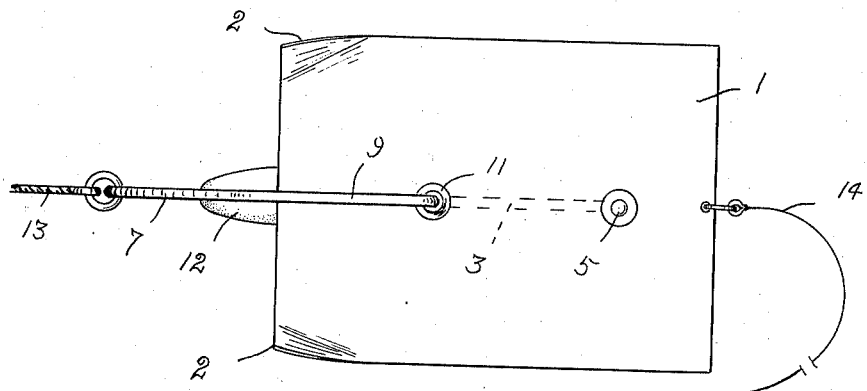
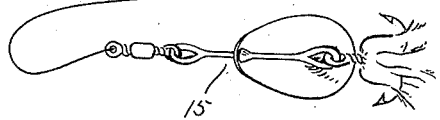
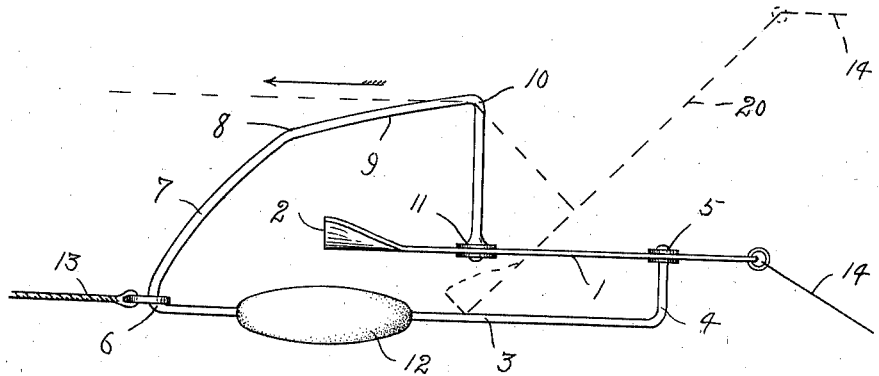
INVENTORS.
Lloyd E. Coolidge &
Francis J. Coolidge.
BY
Geo. Stevens ATTORNEY.

Patented Mar. 25, 1941

2,235,868

UNITED STATES PATENT OFFICE 2,235,868

TROLLING PLANE

Lloyd E. Coolidge and Francis I. Coolidge,
Knife River, Minn.

Application September 5, 1940, Serial No. 355,420

7 Claims. (Cl. 43—49)

This invention relates to fishing apparatus and has special reference to a novel form of trolling plane particularly adapted for use in what is known as deep sea fishing, that is where it is desirable to have the lure as deep as possible in the water being fished in.

The principal object of the invention is to provide such a plane of simple construction, and one that will function most readily in keeping the lure at a predetermined depth in the water under normal circumstances, but that will quickly function to raise the lure when struck by a fish; the advantage of which is well known to all fishermen.

Another object is to provide such a plane having novel attractive properties.

Other objects and advantages of the invention will appear in the following description thereof.

Referring now to the accompanying drawing, forming part of this application, and wherein like reference characters indicate like parts:

Figure 1 is a top plan view of the improved plane.

Figure 2 is a side elevation of Figure 1.

In the drawing, 1 represents the plane which is preferably substantially rectangular in form, except that the two forward corners thereof are curved and turned up as at 2, forming fin-like members upon either side thereof, and which functions to keep the plane right-side up in the water.

The means of suspension comprises a wire frame structure, the lower portion of which is indicated at 3, which is turned up at its rearmost end as at 4 and suitably attached in any desired manner as at 5 through the plane, with the body portion 3 parallel therewith, while at its opposite end, which is materially in advance of the forward end of the plane, it is bent as at 6 and arched upwardly and rearwardly as at 7 to the sharper bend 8, from whence it is somewhat less arched as at 9 and bent slightly downwardly to the elbow 10, and thence perpendicularly down to the plane where it is fixed in any desired manner as at 11.

Upon the body portion 3 and normally just below the forward end of the plane 1 is slidably mounted a weight or sinker 12 which, in this instance, is preferably frictionally held in any desired longitudinal position thereupon, thus providing convenient and quickly manipulated means for changing its position relative to the plane in regulating the diving properties of the plane, as is obvious.

The trolling line is indicated at 13 and shown as engaged in the loop 6 of the wire frame structure, and in which position the plane would ordinarily function in a horizontal position. However, when first put into the water the plane is supposed to be suspended and will normally so be from the lop or elbow 10 of the frame, and is so illustrated in dotted lines at 20, and the relatively shorter line 14 carries the lure, whatever it may be, indicated at 15, a short distance astern or rearwardly of the plane, this, however, normally not affecting the diving properties of the plane whatever. However, when a strike occurs as for example by a fish attacking the lure, the end of the trolling line will instantly be drawn from the elbow 10 to the elbow or loop 6, when the plane will immediately come to the surface of the water. It is deemed essential that the compound angle or arcuate areas of the portions 7, 8 and 9 of the wire be substantially as shown to accomplish the most satisfactory results, the same having been adequately proven in actual practice.

The plane is preferably composed of relatively thin sheet aluminum, highly polished upon both sides to form as attractive a lure as possible to fish at a distance to attract them to the vicinity of same, where it is well known that they will quickly avail themselves of whatever bait is offered.

Having thus described my invention, what we claim and desire to secure by Letters Patent, is:

1. A trolling plane of the type described, including a brightly polished sheet of metal, a compound angularly shaped supporting frame fixed at one end to the upper side of said plane forwardly of the center thereof and at its opposite end to the bottom of said plane rearwardly of the center thereof, and a fish-hook attached by a relatively short line to the center of the rearmost edge of said plane, and means for the selective control of the diving action of said plane.

2. A trolling plane of the type described, including a sheet of metal, a compound angularly shaped supporting frame fixed at one end to the upper side of said plane forwardly of the center thereof and at its opposite end to the bottom of said plane rearwardly of the center thereof, a fish hook supported from the rearmost edge of said plane, and a fish line slidably attachable in either of a plurality of bends in said supporting frame for the selective control of the action of said plane in the water.

3. A trolling plane of the type described, including a sheet of metal, a compound angularly shaped supporting frame having a plurality of bends therein and attached at one end to the upper surface of said plane at its other end to the bottom of said plane, a fish hook supported from the rearmost edge of said plane, and a fish line slidably attachable in said supporting frame normally in one of said bends and in another of said bends when a draft on the rear of the plane occurs.

4. A trolling plane of the type described, including a sheet of metal, a compound angularly shaped supporting frame having a body portion space from and parallel to said sheet of metal, one end of which body portion is bent about the forward end of said metal sheet and attached to the upper surface of said plane and the other end of which body portion is bent at right angles thereto and attached to the bottom of said plane, a fish-hook supported from the rearmost edge of said plane, adjustable means for controlling the action of said plane, and a fish line attachable to said supporting frame and normally maintained in one of said bends and slidable to another of said bends when a draft on the rear of the plane occurs.

5. A trolling plane of the type described, including a sheet of metal, a wire supporting frame having a body portion one end of which is bent at right angles thereto and attached to the bottom of said metal sheet, the other end of said body portion being bent upwardly and backwardly about the forward end of said metal sheet and thence at right angles to said sheet and attached to the upper surface thereof, a fish-hook supported from the rearmost edge of said sheet, and a fish line attachable to said supporting frame.

6. A trolling plane of the type described, including a sheet of metal, a compound angularly shaped supporting frame having a plurality of bends therein and a body portion extending in parallel spaced relation to said sheet of metal, said supporting frame being attached at its ends to opposite surfaces of said plane, said ends each extending from said surfaces a short distance at substantially right angles thereto.

7. The combination substantially as set forth in claim 6, and a weight slidable upon the body portion of said supporting frame for adjustably controlling the action of said plane.

LLOYD E. COOLIDGE.
FRANCIS I. COOLIDGE.